E. ZONA.
INSTRUMENT FOR NAVIGATION AND LIKE PURPOSES.
APPLICATION FILED APR. 18, 1918.
1,305,047.
Patented May 27, 1919.
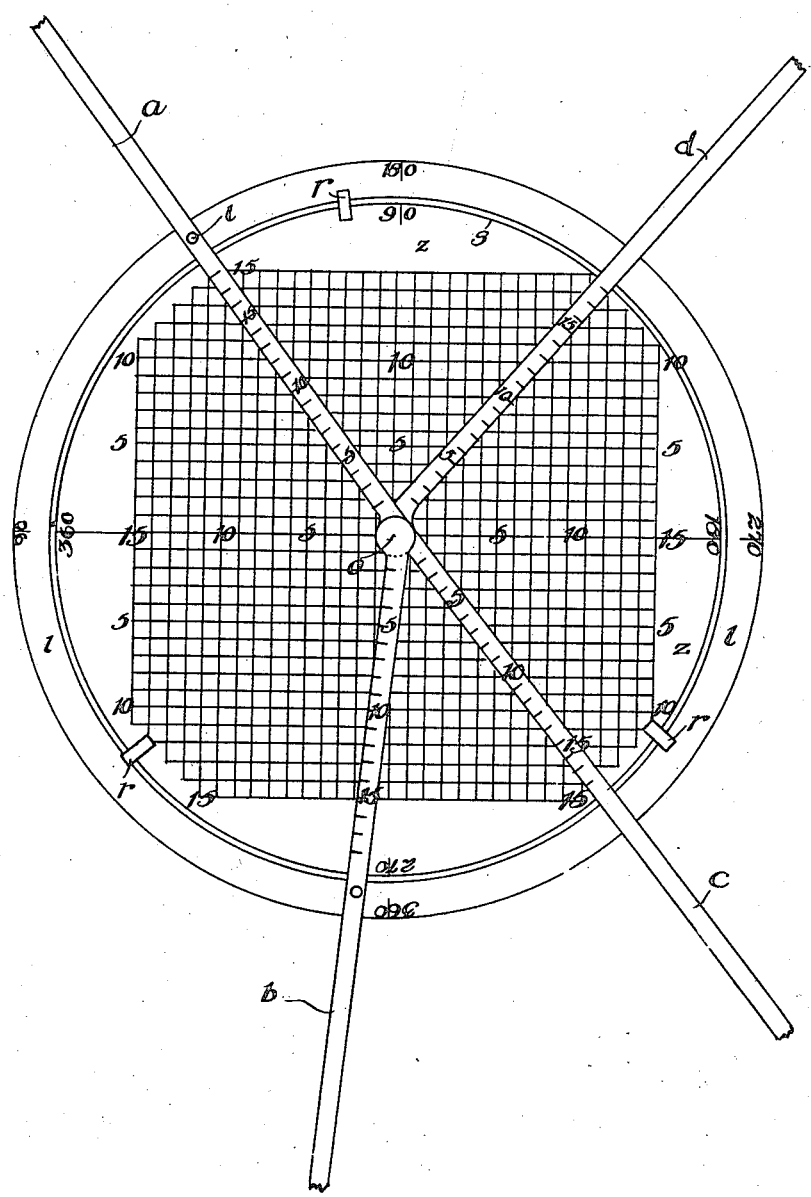
WITNESSES
INVENTOR
Ezio Zona,
BY
ATTORNEYS

UNITED STATES PATENT OFFICE.

EZIO ZONA, OF GENOA, ITALY.

INSTRUMENT FOR NAVIGATION AND LIKE PURPOSES.

1,305,047. Specification of Letters Patent. Patented May 27, 1919.

Application filed April 18, 1918. Serial No. 229,423.

*To all whom it may concern:*

Be it known that I, EZIO ZONA, a subject of the King of Italy, residing at Genoa, in the Kingdom of Italy, have invented new and useful Improvements in or Relating to Instruments for Navigation and like Purposes.

The present invention refers to an instrument which permits of resolving in a quick and easy manner all those problems of plane navigation, the solution of which depends from the determination of the elements of a plane triangle.

The solution of these problems is obtained with the aid of a plane chart to which the instrument is applied, avoiding thus tracing on the same any construction lines which stain the paper and the canceling of them, a practice which, even if the lines are very lightly traced, may give rise to serious inconveniences.

There exists already instruments for the solution of problems relating to navigation, and which comprise a disk, a ring concentric therewith and a square provided with linear and angular graduations, but none of said instruments possess a transparent base and they are not intended for use in combination with a nautical chart on which the lines traced on the disk and on the square appear by the effect of its transparency as if they were traced on the chart itself.

In the annexed drawing is shown a plan view of the instrument, which consists of a transparent and stiff circular disk —z— provided on its edge —s— with a graduation from 0° to 360°.

A ring —l— concentric with the disk —z— is connected to the same by means of small clamps —r— fixed on the latter, which permit the ring —l— to turn freely. This ring is also provided with a graduation from 0° to 360°. On the surface of the disk —z— is traced a scale comprising 30 equal divisions. On the center —o— of the circle are pivoted four alidades —a—, —b—, —c— and —d— each of which has one of its edges passing through the common center —o— of the disk and the ring. Starting from the center, these alidades are graduated and each division of their graduation corresponds to a division of the disk. The instrument is further provided with set screws —i— which serve to clamp the alidades in any desired position and with a small hole in the center —o— to receive a pressing point to indicate the position of the ship.

Hereinafter are mentioned by way of example a few problems which can be solved by the use of the above described device.

*Problem I.*—To mark on the chart the position of the ship when the latitude and the longitude are given.

The two alidades —a—, and —b—, are set at right angles to each other, which can easily be done by putting one on 0° and the other on 90° of one of the graduations. One of these alidades is then brought into such a position, that it passes through the point on the border of the chart which corresponds to the number of degrees and minutes of the given longitude, and the other alidade through the point on the other edge, corresponding to the number of degrees and minutes of the given latitude, and the center —o— will give the position of the ship. This is evident, because the two alidades which are at right angles to each other remain also at right angles to the two scales of latitude and longitude.

*Problem II.*—To determine the latitude and longitude of a given point on the plane chart.

Clamp two alidades at right angles as in Problem I, set the instrument on the chart with one of the diameters 0°—180°, and 90°—270° successively on a parallel or meridian in such a way that the alidade at right angles to said diameter passes through the point of the ship. In the first case the alidade will give the meridian of the point and consequently will indicate on the respective scale the longitude and in the second case the latitude.

*Problem III.*—To trace the course of a ship from a given starting point.

After having set the instrument as in the previous cases, the third or fourth alidade, which is free, is rotated until it indicates the course to be followed. The degrees as read on the edge of the ring —a— will indicate the real course. If a magnetic or deviated course is desired, it will suffice to rotate the circle —z— in such a way that its zero differs from that of the ring —a— by an angle equal in value and sign to the magnetic declination or to the total error. Evidently the courses read on the ring will be respectively magnetic or deviated.

*Problem IV.*—To mark the point of the ship, two bearings being known.

Clamp two or three alidades on the angles corresponding to the given bearing by reading the angles on the graduation of the outer ring and place the instrument in such a position that one of the diameters 0°—180°, or 90°—270° passes respectively through a meridian or a parallel.

The instrument is then successively displaced in such a way that the three alidades marking the angles of the bearings pass successively through the sighted points and the correspondent bearings are then traced. Thereafter the instrument is brought into such a position that the three bearings traced coincide with the alidades and the center of the instrument will evidently coincide with the ship's position.

If one alidade is clamped on the 0° of the outer graduation or on 180°, the same will indicate on the opposite scale the longitude, and by moving the alidade on 90° or on 270° it will indicate the latitude.

*Problem V.*—Having the coördinates of a point, to obtain the bearings of land points.

The instrument is placed as in Problem II and the free alidades are made to pass through the points of which the bearings are requested. The degrees marked by the edges of the alidades give the value of the bearings.

The instrument can also be used as station pointer.

One of the alidades is clamped on 0° of the outer circle and the other two, one on the right and one on the left of the first one, so as to form with same the two angles measured with the sextant or with the circle. After having thus adjusted the alidades, the instrument can be used as a common station pointer. In fact if one of the alidades is clamped on 0°, the other two alidades can be clamped on the right and on the left under an angle which is equal to the measured one.

Having determined the point, without moving the instrument, the two alidades are disengaged and set one on 0° and the other on 180° of the outer graduation and the second one on 90° or on 270°. The whole system formed by the outer ring and the three alidades is then rotated until the two 0°—180° pass through the same number of degrees and minutes of the longitude, giving thus the longitude, while the third alidade gives the latitude. The fourth alidade will indicate the course to be followed.

Briefly the scale and the scales of the alidades serve to solve any problems of plane navigation the solution of which depends upon the solution of a plane triangle. In fact taking as base of the triangle to be solved, the line of the scale corresponding to the diameter 0°—180° of the inner disk and disposing conveniently one or two alidades, all the triangles necessary for the resolution of the problems can be constructed.

The following advantages are obtained by the use of this new device: rapidity and accuracy in the solution of all problems, complete exclusion of parallels, the tracing of which proves to be always tiresome even if by means of rollers on account of the inevitable displacements especially if the table is not perfectly even, and lastly the possibility of reading at the same time the course and the real and deviated or magnetic bearings.

This device also eliminates the use of any pencil which stains the paper and requires continuous canceling causing thus often deteriorations of the paper and even the disappearance of marks for little but dangerous obstructions and soundings which may cause sometimes very grave consequences.

Claim:

A navigation instrument comprising a transparent disk provided with a circular scale and having two series of straight parallel lines inscribed thereon, the lines of each series being arranged at right angles to the lines of the other and being numbered from the center of said disk, an annulus having a circular scale rotatably connected to and concentric with said disk, and four alidades extending across said disk and annulus and pivoted for independent rotation at the center of said disk, each alidade having a graduated straight edge radiating from said center.

In testimony whereof I have signed my name to this specification in the presence of two subscribing witnesses.

EZIO ZONA.

Witnesses:
 WILLIAM P. SHOCKLEY,
 EDWIN N. ATHERTON.